United States Patent
Huang et al.

(10) Patent No.: US 12,425,740 B1
(45) Date of Patent: Sep. 23, 2025

(54) CORRECTION METHOD, CORRECTION SYSTEM AND AUXILIARY METHOD OF CORRECTION PROCEDURE FOR PANORAMIC IMAGE OF SHIP

(71) Applicant: Whetron Electronics Co., Ltd., New Taipei (TW)

(72) Inventors: Hung-Hsien Huang, New Taipei (TW); Yuan-Cheng Ou, New Taipei (TW); Pei-Jung Hung, New Taipei (TW); Hsiu-Ling Yen, New Taipei (TW)

(73) Assignee: WHETRON ELECTRONICS CO., LTD, New Taipei (TW)

( * ) Notice: Subject to any disclaimer, the term of this patent is extended or adjusted under 35 U.S.C. 154(b) by 0 days.

(21) Appl. No.: 18/939,663

(22) Filed: Nov. 7, 2024

(30) Foreign Application Priority Data

Aug. 20, 2024 (TW) ................................. 113131326

(51) Int. Cl.
*H04N 23/698* (2023.01)
*G06T 7/80* (2017.01)

(52) U.S. Cl.
CPC ............. *H04N 23/698* (2023.01); *G06T 7/80* (2017.01); *G06T 2200/24* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 7,719,563 B2* | 5/2010 | Richards | H04N 21/242 348/36 |
| 10,334,220 B2* | 6/2019 | Van Hoff | H04N 13/271 |
| 2015/0143421 A1* | 5/2015 | Williams | H04N 21/64322 725/38 |
| 2016/0028951 A1* | 1/2016 | Mayuzumi | G02B 13/0015 348/36 |
| 2016/0132278 A1* | 5/2016 | Gillard | H04N 21/4728 345/682 |
| 2017/0132762 A1* | 5/2017 | Zhou | G06T 3/4038 |
| 2017/0300051 A1* | 10/2017 | Zhou | F03D 9/25 |
| 2018/0204311 A1* | 7/2018 | Kishine | G06T 5/50 |
| 2019/0164252 A1* | 5/2019 | Mashitani | G09G 5/37 |
| 2023/0350412 A1* | 11/2023 | Shatters | G05D 1/0038 |

(Continued)

*Primary Examiner* — Mohammad J Rahman
(74) *Attorney, Agent, or Firm* — Birch, Stewart, Kolasch & Birch, LLP (57) ABSTRACT

A correction method, a correction system and an auxiliary method of a correction procedure for a panoramic image of a ship are provided. A correction method includes the following steps. A plurality of setting positions of a plurality of external correction marks and a plurality of internal correction marks are obtained according to a ship information and a resolution information of a plurality of image capture devices. The external correction marks and the internal correction marks are placed around the ship according to the setting positions. A plurality of images are captured by the image capture devices. Two of the external correction marks and two of the internal correction marks are identified in each of the images. A plurality of position image coordinates of the external correction marks and the internal correction marks at the images are recorded. The position image coordinates are used to obtain a panoramic image.

20 Claims, 12 Drawing Sheets

(56) References Cited

U.S. PATENT DOCUMENTS

| | | | |
|---|---|---|---|
| 2023/0394766 A1* | 12/2023 | Yun | G06V 10/24 |
| 2024/0020801 A1* | 1/2024 | Shatters | G06T 5/50 |
| 2025/0076621 A1* | 3/2025 | Bowron | G02B 13/18 |

* cited by examiner

CORRECTION METHOD, CORRECTION SYSTEM AND AUXILIARY METHOD OF CORRECTION PROCEDURE FOR PANORAMIC IMAGE OF SHIP

This application claims the benefit of Taiwan application Serial No. 113131326, filed Aug. 20, 2024, the disclosure of which is incorporated by reference herein in its entirety.

TECHNICAL FIELD

The disclosure relates in general to an image correction method, a correction system and an auxiliary method of a correction procedure, and more particularly to a correction method, a correction system and an auxiliary method of a correction procedure for a panoramic image of a ship.

BACKGROUND

To assist the driving of vehicles, a panoramic image has been developed for the drivers to observe the environment around the vehicle quickly. The panoramic image is synthesized from images from multiple directions. Before the vehicle leaves the factory, the panoramic image needs to be corrected to obtain correction parameters. Using these correction parameters, the panoramic image could be quickly synthesized while the vehicle is running.

The existing correction method for the panoramic image of the car is performed on the ground, and the target object is the traffic sign line on the ground. However, the ship is floating on the water, so it is difficult to maintain stability during the calibration process. In addition, the ship is much larger than the car, and the calibration pattern of the car cannot be used.

If the image is not accurately calibrated, it will affect the accuracy of the panoramic view applied to the ship, which may cause the ship to generate warning misjudgments in the panoramic image when it is parked, and may cause it to hit objects on the shore or other ships.

SUMMARY

The disclosure is directed to a correction method, a correction system and an auxiliary method of a correction procedure for a panoramic image of a ship. Before the ship leaves the factory, the position image coordinates are corrected. After the accurate position image coordinates are recorded, the ship could perform splicing or fusion of images during operation to quickly obtain an accurate panoramic image.

According to one embodiment, a correction method for a panoramic image of a ship is provided. The correction method for the panoramic image of the ship includes the following steps. A ship information of the shop is provided. A resolution information of a plurality of image capture devices disposed around the ship is provided. A plurality of setting positions of a plurality of external correction marks and a plurality of internal correction marks are obtained according to the ship information and the resolution information of the image capture devices. The external correction marks and the internal correction marks are placed around the ship according to the setting positions. A plurality of images are captured by the image capture devices. Two of the external correction marks and two of the internal correction marks are recognized in each of the images. A plurality of position image coordinates of the external correction marks and the internal correction marks at the images are recorded. The position image coordinates are used to obtain the panoramic image.

According to another embodiment, a correction system for a panoramic image of a ship is provided. The correction system includes a correction mark setting unit, a storage unit, a recognizing unit and a coordinate unit. The correction mark setting unit is configured to obtain a plurality of setting positions of a plurality of external correction marks and a plurality of internal correction marks according to a ship information and a resolution information of a plurality of image capture devices. The external correction marks and the internal correction marks are placed around the ship according to the setting positions. The storage unit is configured to store a plurality of images captured by the image capture devices. The recognizing unit is configured to recognize two of the external correction marks and two of the internal correction marks in each of the images. The coordinate unit is configured to record a plurality of position image coordinates of the external correction marks and the internal correction marks at the images to the storage unit. The position image coordinates are used to obtain the panoramic image.

According to an alternative embodiment, an auxiliary method for a correction procedure of a panoramic image of a ship is provided. The auxiliary method for the correction procedure of the panoramic image of the ship includes the following steps. A user interface for a user to input a ship information of the ship is provided. A plurality of setting positions of a plurality of external correction marks and a plurality of internal correction marks are displayed in the user interface. The setting positions are obtained according to the ship information and a resolution information of a plurality of image capture devices. The image capture devices are disposed around the ship. The external correction marks and the internal correction marks are placed around the ship according to the setting positions. A plurality of frames are provided to display a plurality of images captured by the image capture devices. Two of the external correction marks and two of the internal correction marks are indicated in each of the images. A plurality of position image coordinates of the external correction marks and the internal correction marks at the images are recorded. The position image coordinates are used to obtain the panoramic image.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Figure 1:
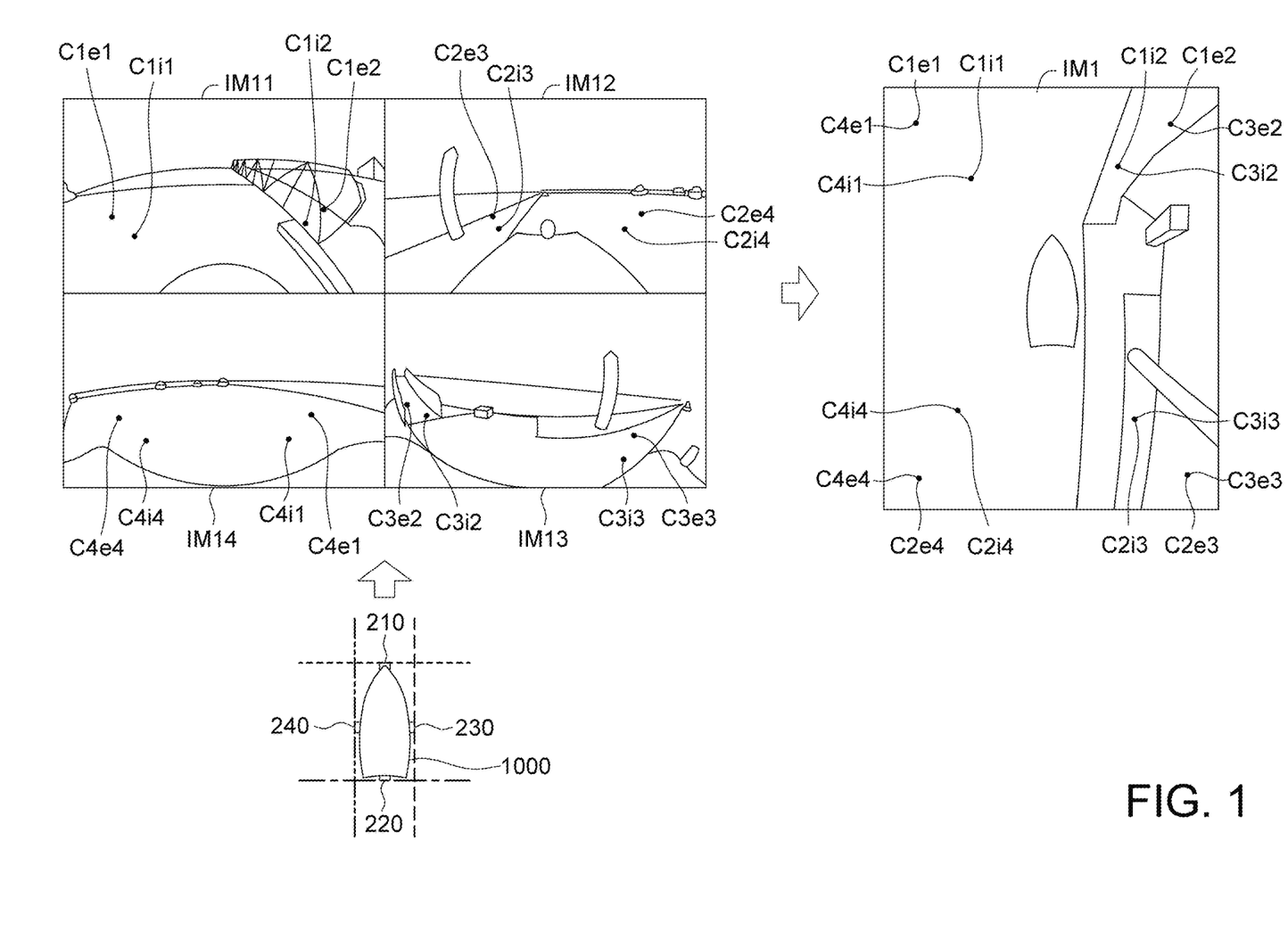
FIG. 1 illustrates a formation process of a panoramic image of a ship.

Please refer to FIG. 1, which illustrates a formation process of a panoramic image IM1 of a ship 1000. For example, a plurality of image capture devices 210, 220, 230, 240 around the ship 1000 are used to capture a plurality of images IM11, IM12, IM13, IM14, and then a plurality of position image coordinates C1$e$1, C1$i$l, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 are used to perform splicing or fusion on the images IM11, IM12, IM13, IM14 to obtain the panoramic image IM1.

Since the installation conditions and the image capture parameters of the image capture devices 210, 220, 230, 240 may be slightly different in each ship 1000, it is necessary to perform the correction on the position image coordinates C1$e$1, C1$i$1, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 before the ship 1000 leaves the factory. After the accurate position image coordinates C1$e$1, C1$i$1, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 are recorded, the ship 1000 could perform stitching or fusion on the images IM11, IM12, IM13, IM14 to quickly obtain the accurate panoramic image IM1 during operation.

Figure 2:
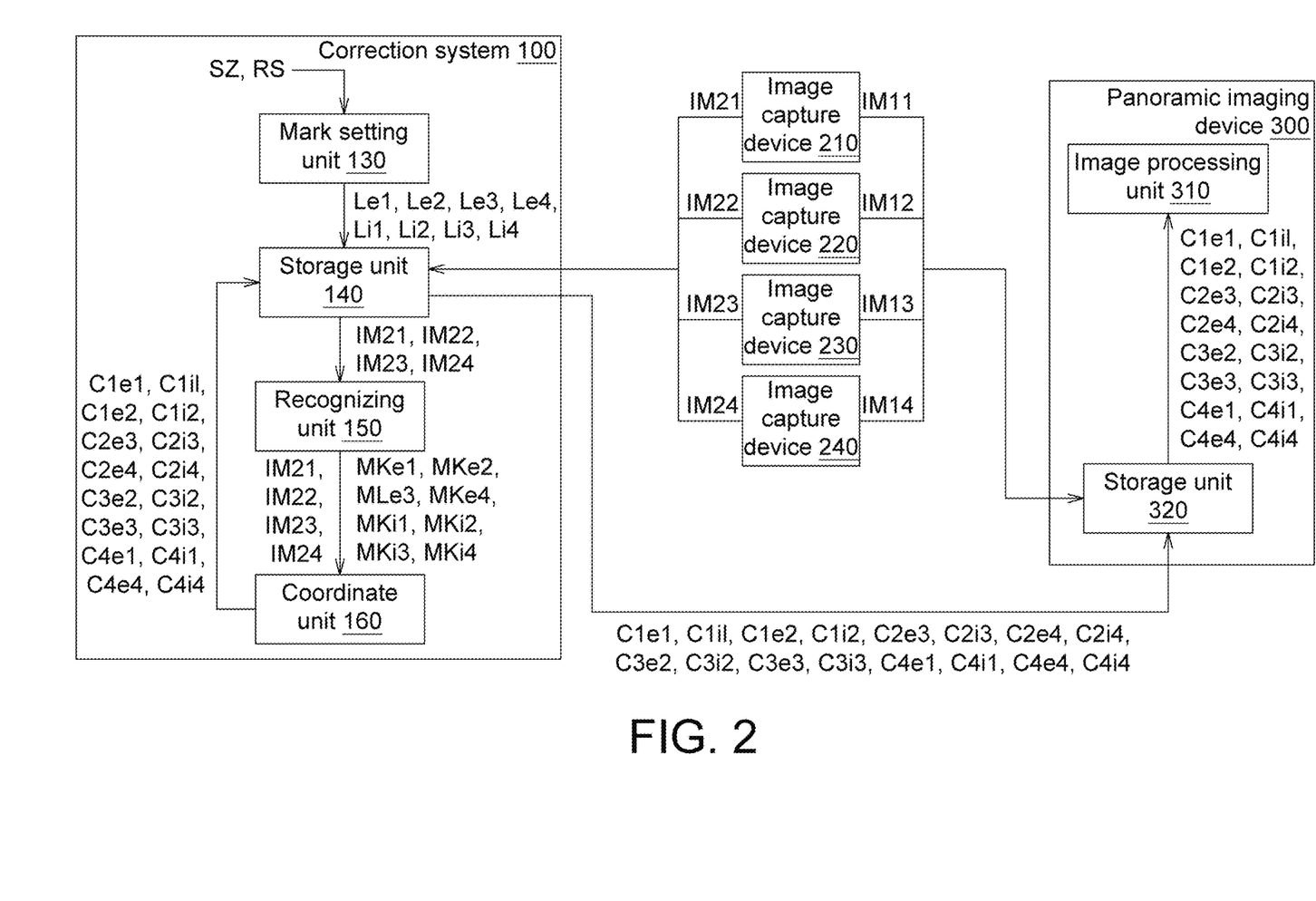
FIG. 2 illustrates a block diagram of a correction system, a plurality of image capture devices and a panoramic imaging device for the panoramic image of the ship according to an embodiment of the present disclosure.

Please refer to FIG. 2, which illustrates a block diagram of a correction system 100, the image capture devices 210, 220, 230, 240 and a panoramic imaging device 300 for the panoramic image IM1 of the ship 1000 according to an embodiment of the present disclosure. The correction system 100 includes a correction mark setting unit 130, a storage unit 140, a recognizing unit 150 and a coordinate unit 160. The correction mark setting unit 130, the recognizing unit 150 and the coordinate unit 160 are used to perform various analysis and calculation procedures. The storage unit 140 is used to store data.

The image capture devices 210, 220, 230, 240 are disposed around the ship 1000, for example, at four positions: front, back, left, and right, but are not limited to these.

The panoramic imaging device 300 includes an image processing unit 310 and a storage unit 320. The image processing unit 310 is used to perform various image processing procedures such as splicing, fusion, and resolution adjustment of images. The storage unit 320 is used to store data.

The correction mark setting unit 130, the recognizing unit 150, the coordinate unit 160 and/or the image processing unit 310 is, for example, a circuit, a circuit board, a storage device storing program code or a chip. The chip is, for example, a central processing unit (CPU), a programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), an embedded system, a field programmable gate array (FPGA), other similar element or a combination thereof.

The storage unit 140 and/or the storage unit 320 is, for example, any type of fixed or movable random access memory (RAM), read-only memory (ROM), flash memory, hard disk drive (HDD), solid state drive (SSD) or similar elements or combinations of the above elements.

In this embodiment, the ship 1000 could be calibrated by the image capture devices 210, 220, 230, 240 and the correction system 100 before leaving the factory. After the ship 1000 leaves the factory, the image capture devices 210, 220, 230, 240 and the panoramic imaging device 300 could be used to generate the panoramic image IM1. In one embodiment, the correction system 100 could be uninstalled after the ship 1000 leaves the factory, and the correction parameters obtained by the correction system 100 are stored in the storage unit 320 of the panoramic imaging device 300. The following is a flow chart that explains the operation of each of the above components in detail.

Figure 3:
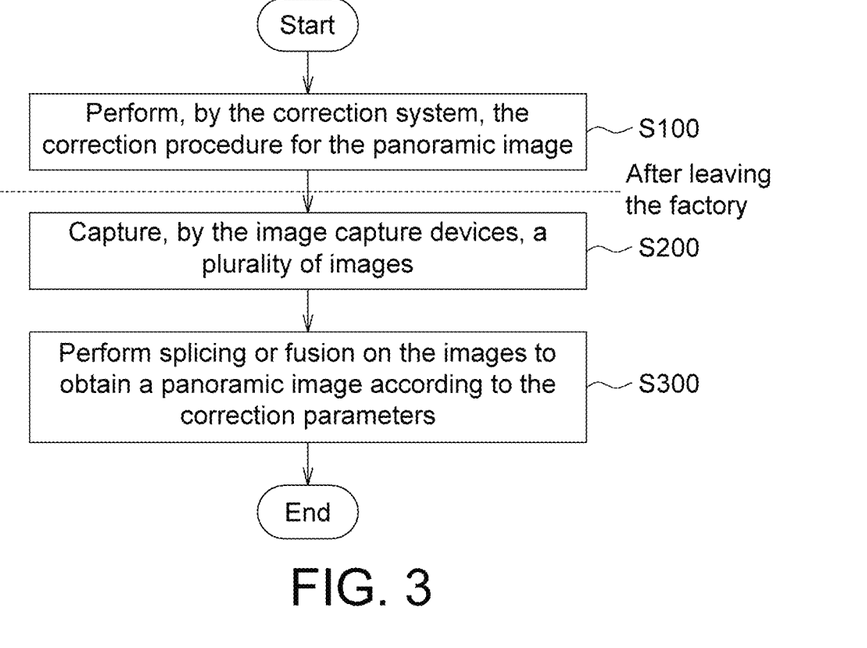
FIG. 3 illustrates a flow chart of a method for generating the panoramic image of the ship according to an embodiment of the present disclosure.

Please refer to FIG. 3, which illustrates a flow chart of a method for generating the panoramic image IM1 of the ship 1000 according to an embodiment of the present disclosure. The method for generating the panoramic image IM1 of the ship 1000 includes steps S100, S200, S300. In the step S100, the correction procedure of the panoramic image IM1 is performed by the correction system 100. The details of the calibration procedure will be explained later. After the calibration procedure is completed, the relevant calibration parameters will be recorded.

Next, in the step S200, a plurality of images IM11, IM12, IM13, and IM14 are captured by the image capture devices 210, 220, 230, and 240. The number of the images is not limited to this disclosure.

Then, in the step S300, the images IM11, IM12, IM13, and IM14 are spliced or fused to obtain the panoramic image IM1 according to the aforementioned correction parameters.

The above step S100 is executed before leaving the factory, while the steps S200 and S300 are executed after leaving the factory.

Figure 4:
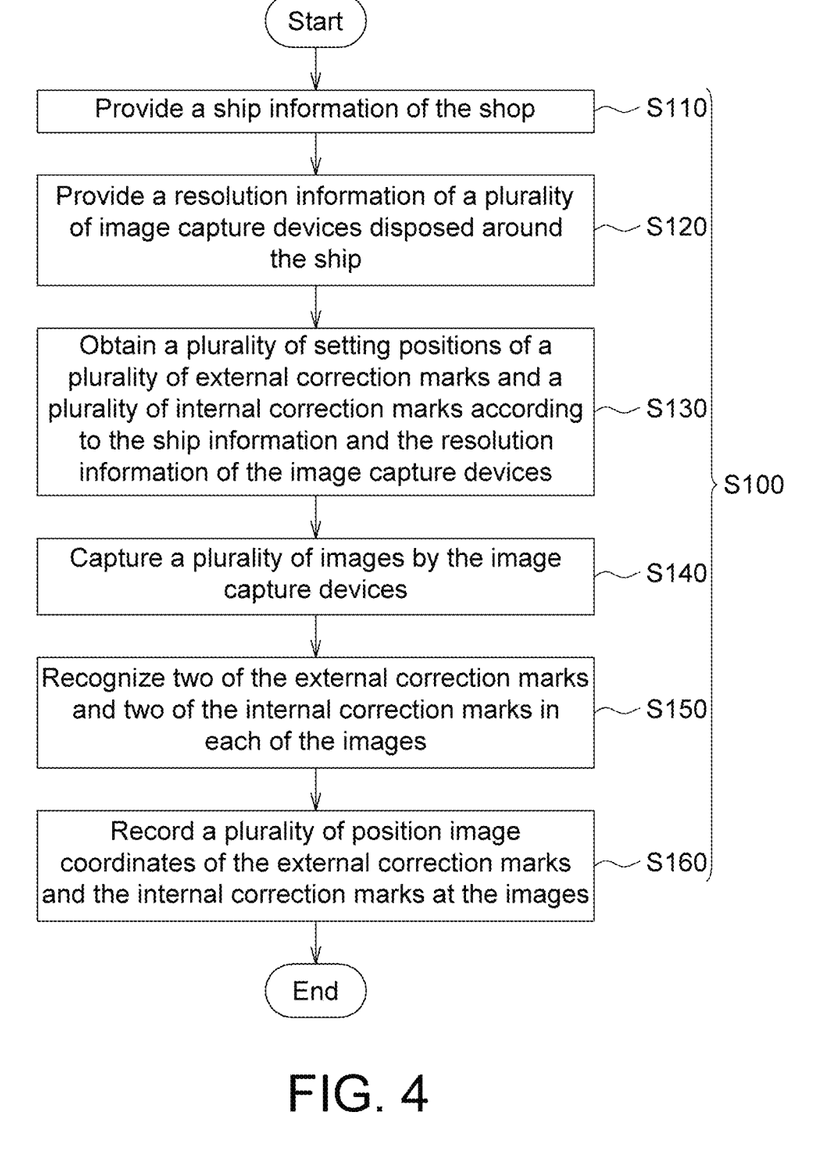
FIG. 4 illustrates a flow chart of a correction method for the panoramic image of the ship according to an embodiment of the present disclosure.

Please refer to FIG. 4, which illustrates a flow chart of the correction method for the panoramic image IM1 of the ship 1000 according to an embodiment of the present disclosure. The correction method for the panoramic image IM1 of the ship 1000 is the aforementioned step S100, which includes steps S110, S120, S130, S140, S150, S160.

In the step S110, as shown in FIG. 2, a ship information SZ of the ship 1000 is provided. The ship information SZ includes, for example, the width of the ship 1000, the length of the ship 1000, the height of the ship 1000, the type of the ship 1000 and the installation location of the image capture devices.

Next, in the step S120, as shown in FIG. 2, a resolution information RS of the image capture devices 210, 220, 230, and 240 is provided. For example, the image capture devices 210, 220, 230, 240 could be the same or different.

Figure 5:
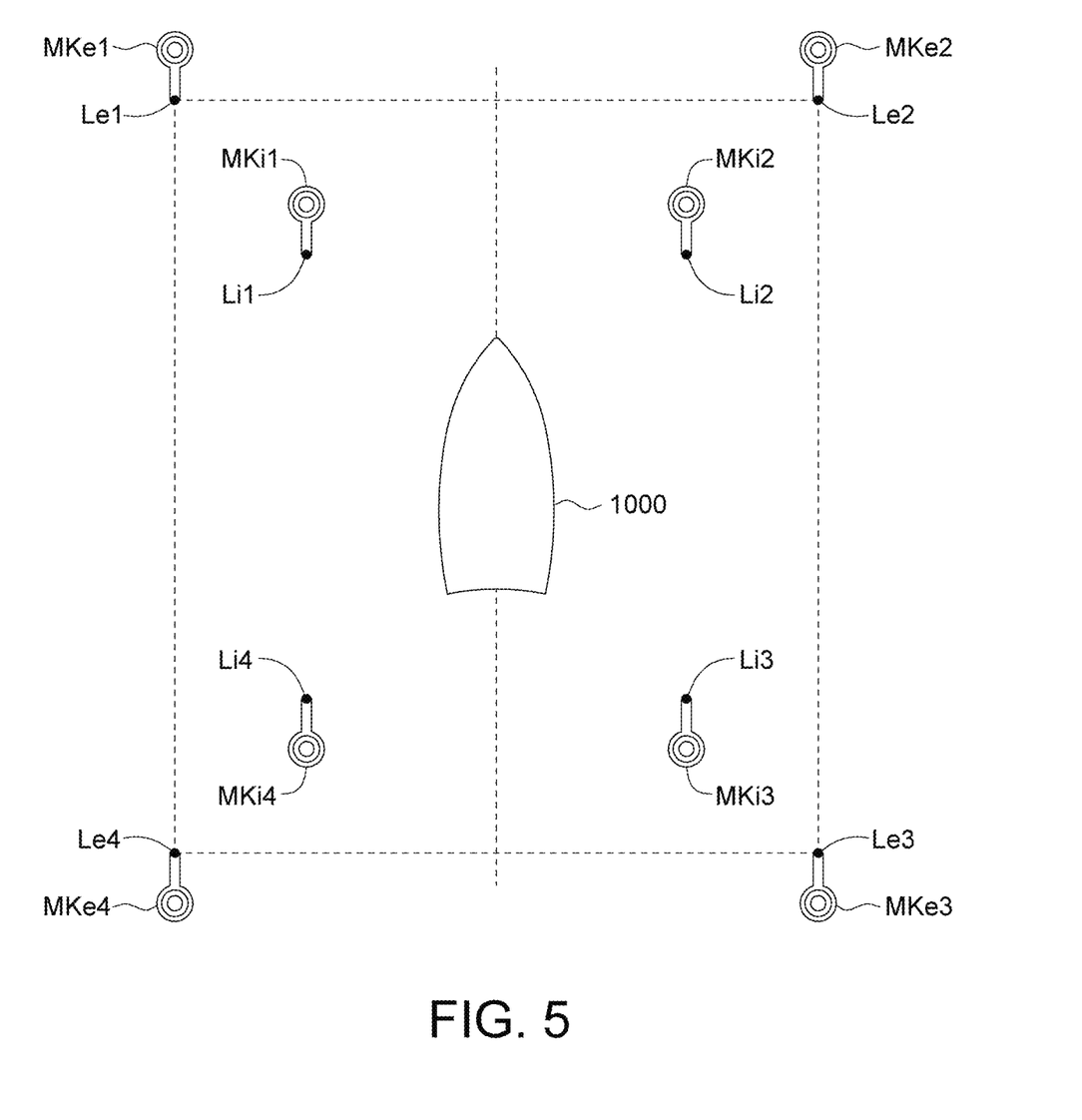
FIG. 5 illustrates the relationship between the ship and a plurality of external correction marks and a plurality of internal correction marks.

Then, please refer to FIG. 5, which illustrates the relationship between the ship 1000 and a plurality of external correction marks MKe1, MKe2, MKe3, MKe4 and a plurality of internal correction marks MKi1, MKi2, MKi3, MKi4. The external correction marks MKe1, MKe2, MKe3, MKe4 and the internal correction marks MKi1, MKi2, MKi3, MKi4 are disposed around the ship 1000 according to a plurality of setting positions Le1, Le2, Le3, Le4, Li1, Li2, Li3, Li4.

Figure 6:
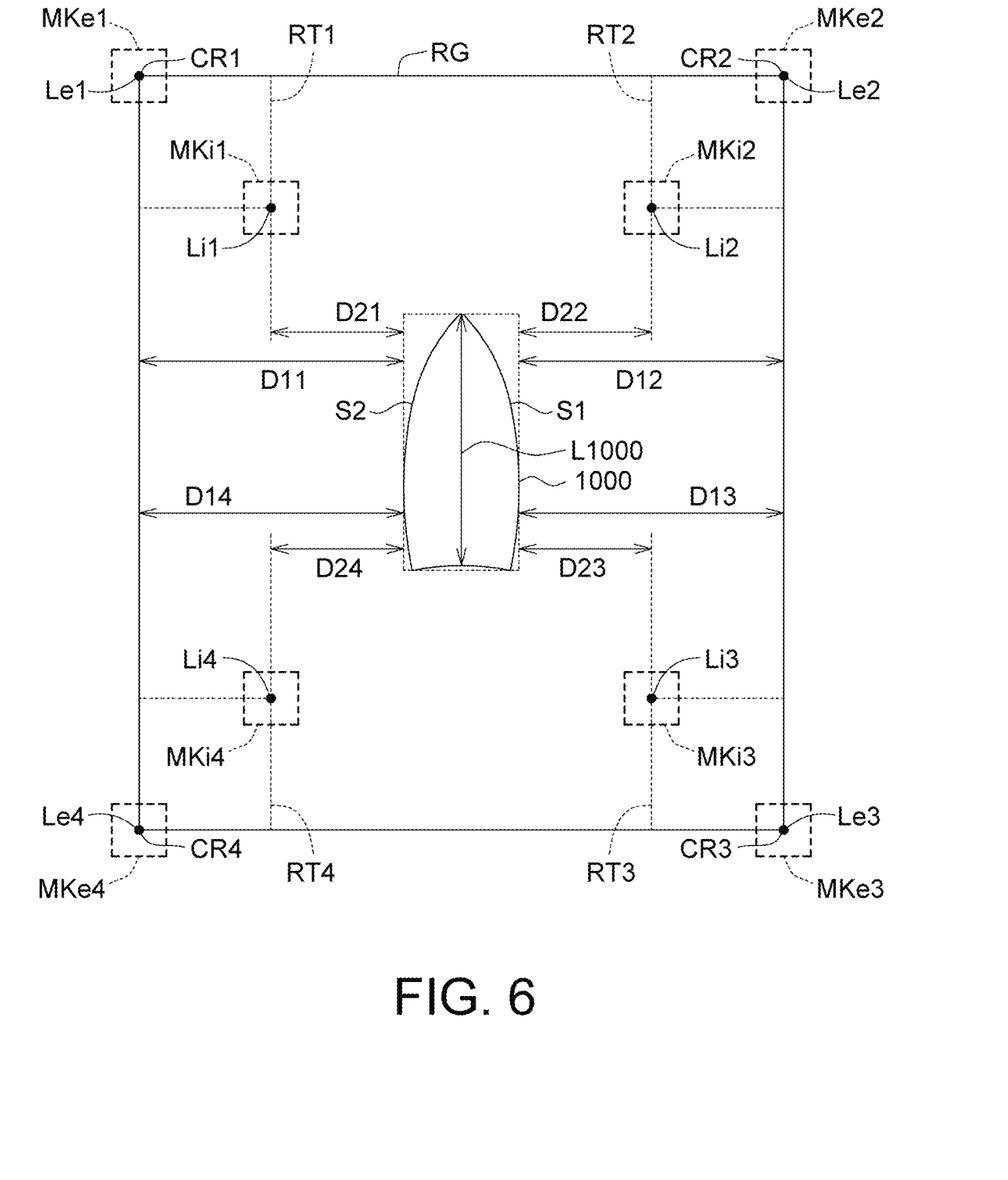
FIG. 6 illustrates a plurality of setting positions of the external correction marks and the internal correction marks.

Please refer to FIG. 6, which illustrates the setting positions Le1, Le2, Le3, Le4, Li1, Li2, Li3, Li4 of the external correction marks MKe1, MKe2, MKe3, MKe4 and the internal correction marks MKi1, MKi2, MKi3, MKi4. The setting positions Le1, Le2, Le3, Le4 of the external correction marks MKe1, MKe2, MKe3, MKe4 are located at a plurality of outer corner points CR1, CR2, CR3, CR4 of a viewing range RG.

Each of the external correction marks MKe1, MKe2, MKe3, MKe4 and each of the internal correction marks MKi1, MKi2, MKi3, MKi4 corresponding thereto are located at the diagonal points of each of the rectangles RT1, RT2, RT3, RT4. The rectangles RT1, RT2, RT3, RT4 are, for example, square or rectangular. The rectangles RT1, RT2, RT3, RT4 are located at the corners of the viewing range RG.

A distance D11 between the external correction mark MKe1 and a long side S2 of the ship 1000 is related to a maximum viewing range of the image capture device 240 disposed at the long side S2, and could be adjusted to between 3 and 6 meters according to the visual requirements. A distance D12 between the external correction mark MKe2 and a long side S1 of the ship 1000 is related to a maximum viewing range of the image capture device 230 disposed at the long side S1, and could be adjusted to between 3 and 6 meters according to the visual requirements. A distance D13 between the external correction mark MKe3 and the long side S1 of the ship 1000 is related to the maximum visual range of the image capture device 230 disposed at the long side S1, and could be adjusted to between 3 and 6 meters according to the visual requirements. A distance D14 between the external correction mark MKe4 and the long side S2 of the ship 1000 is related to the maximum viewing range of the image capture device 240 disposed at the long side S2, and could be adjusted to between 3 and 6 meters according to the visual requirements.

A distance D21 between the internal correction mark MKi1 and the long side S2 of the ship 1000 is related to the maximum viewing range of the image capture device 240 disposed at the long side S2, and could be adjusted to between 1.5 to 3 meters according to the visual requirements. A distance D22 between the internal correction mark MKi2 and the long side S1 of the ship 1000 is related to a maximum viewing range of the image capture device 230 disposed at the long side S1, and could be adjusted to between 1.5 to 3 meters according to the visual requirements. A distance D23 between the internal correction mark MKi3 and the long side S1 of the ship 1000 is related to the maximum viewing range of the image capture device 230 disposed at the long side S1, and could be adjusted to between 1.5 to 3 meters according to the visual requirements. A distance D24 between the internal correction mark MKi4 and the long side S2 of the ship 1000 is related to the maximum viewing range of the image capture device 240 disposed on the long sides S1, S2, and could be adjusted to between 1.5 to 3 meters according to the visual requirements. Basically, the distances D21, D22, D23, D24 between the internal correction marks MKi1, MKi2, MKi3, MKi4 and the long side S1 of the ship 1000 is equal to or less than half of the distances D11, D12, D13, D14 between the external correction marks MKe1, MKe2, MKe3, MKe4 and the long sides S1, S2 of the ship 1000.

The appropriate setting positions Le1, Le2, Le3, Le4, Li1, Li2, Li3, Li4 could make the image capture devices 210, 220, 230, 240 correctly capture the external correction marks MKe1, MKe2, MKe3, MKe4 and the internal correction marks MKi1, MKi2, MKi3, MKi4, to facilitate subsequent identification and calibration.

Figure 7:
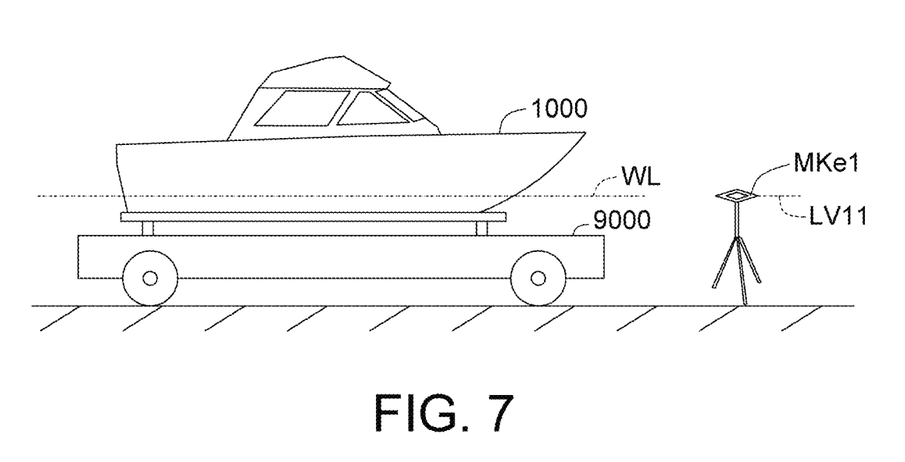
FIG. 7 illustrates a side view of the ship and one of the external correction marks according to an embodiment of the present disclosure.

Please refer to FIG. 7, which illustrates a side view of the ship 1000 and the external correction mark MKe1 according to an embodiment of the present disclosure. During the calibration, the ship 1000 is loaded on a trailer 9000, and the ship 1000 is placed on land to keep the ship 1000 stable. The external correction mark MKe1 is, for example, mounted on a tripod and disposed at a height position LV11. The height position LV11 is on the same horizontal plane as the waterline WL of the ship 1000. In the FIG. 7, only the external correction mark MKe1 is shown. The external correction marks MKe2, MKe3, MKe4 and the internal correction marks MKi1, MKi2, MKi3, MKi4, which are also mounted on tripods and disposed on the same horizontal plane as the waterline WL of the ship 1000.

Figure 8:
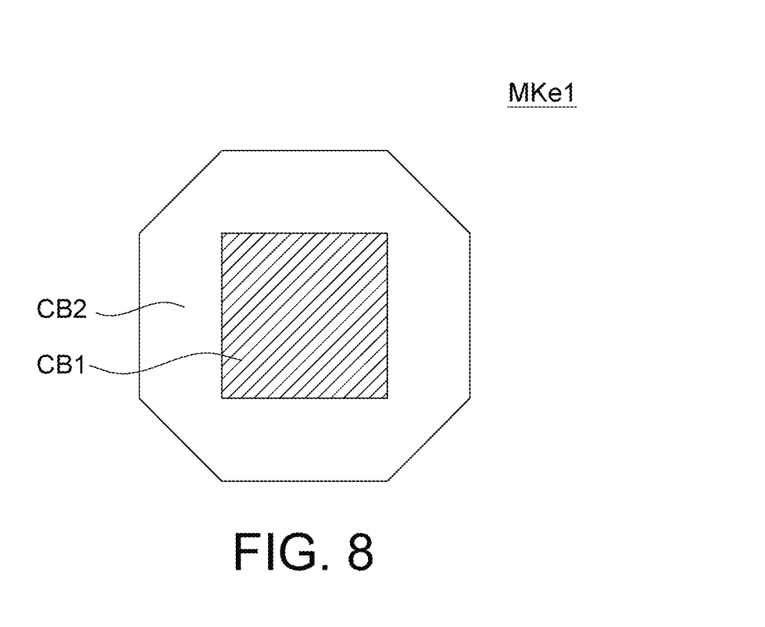
FIG. 8 illustrates one of the external correction marks according to an embodiment of the present disclosure.

Please refer to FIG. 8, which illustrates the external correction mark MKe1 according to an embodiment of the present disclosure. The external correction mark MKe1 includes a first color block CB1 and a second color block CB2, and the second color block CB2 surrounds the first color block CB1. The first color block CB1 and the second color block CB2 are contrasting colors. For example, the first color block CB1 is black, and the second color block CB2 is white.

The width of the second color block CB2 is, for example, greater than or equal to 10 cm. The first color block CB1, for example, is a rectangle, and the edge of the second color block CB2, for example, is an octagon.

In the FIG. 8, only the external correction mark MKe1 is shown. The external correction marks MKe1, MKe2, MKe3, MKe4 and the internal correction marks MKi1, MKi2, MKi3, MKi4 are substantially have similar characteristics, and the similarities are not repeated here.

Then, in the step S140, as shown in FIG. 2, the image capture devices 210, 220, 230, 240 capture the images IM21, IM22, IM23, IM24. Since the external correction marks MKe1, MKe2, MKe3, MKe4 and the internal correction marks MKi1, MKi2, MKi3, MKi4 have been arranged around the ship 1000 according to the setting positions Le1, Le2, Le3, Le4, Li1, Li2, Li3, Li4, the image IM21 should contain the external correction marks MKe1, MKe2 and the internal correction marks MKi1, MKi2, the image IM22 should contain the external correction marks MKe3, MKe3 and the internal correction marks MKi3, MKi4, the image IM23 should contain the external correction marks MKe2, MKe3 and the internal correction marks MKi2, MKi3, the image IM24 should contain the external correction marks MKe1, MKe4 and the internal correction marks MKi1, MKi4.

In one embodiment, the number of the external correction marks could be only two and the number of the internal correction marks could be only two. In this embodiment, the image capture devices 210, 220, 230, 240 do not capture images at the same time. Every time an image is captured, some of the two external correction marks and the two internal correction marks are moved and the two external correction marks and the two internal correction marks are captured in one image.

Next, in the step S150, as shown in FIG. 2, the recognizing unit 150 recognizes two of the external correction marks MKe1, MKe2, MKe3, MKe4 and two of the internal correction marks MKi1, MKi2, MKi3, MKi4 in the images IM21, IM22, IM23, IM24.

Then, in the step S160, as shown in FIG. 2, the coordinate unit 160 records the position image coordinates C1$e$1, C1$i$l, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 of the external correction marks MKe1, MKe2, MKe3, MKe4 and the internal correction marks MKi1, MKi2, MKi3, MKi4 in the images IM21, IM22, IM23, IM24 to the storage unit 140.

According to the above process, after the position image coordinates C1$e$1, C1$i$l, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 are recorded in the storage unit 140, they can be transferred to the storage unit 320 of the panoramic imaging device 300, and be used to obtain the panoramic image IM1 in the subsequent step S300.

Figure 9:
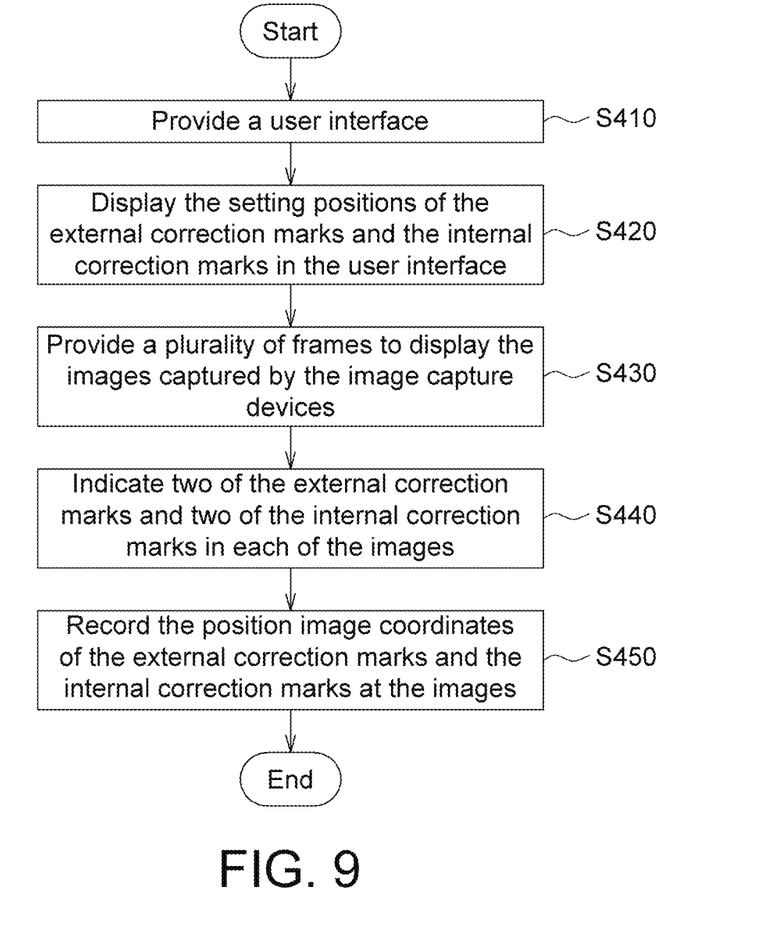
FIG. 9 illustrates a flow chart of an auxiliary method of the correction process for the panoramic image of the ship according to an embodiment of the present disclosure.

Based on the above correction method for the panoramic image IM1, the present disclosure further provides an auxiliary method of the correction procedure for the panoramic image IM1. Please refer to FIG. 9, which illustrates a flow chart of an auxiliary method of the correction process for the panoramic image IM1 of the ship 1000 according to an embodiment of the present disclosure. The auxiliary method of the calibration procedure mainly provides a user interface that could guide the user to operate and assist the user in completing the calibration procedure. The auxiliary method of the calibration procedure includes steps S410, S420, S430, and S440.

Figure 10:
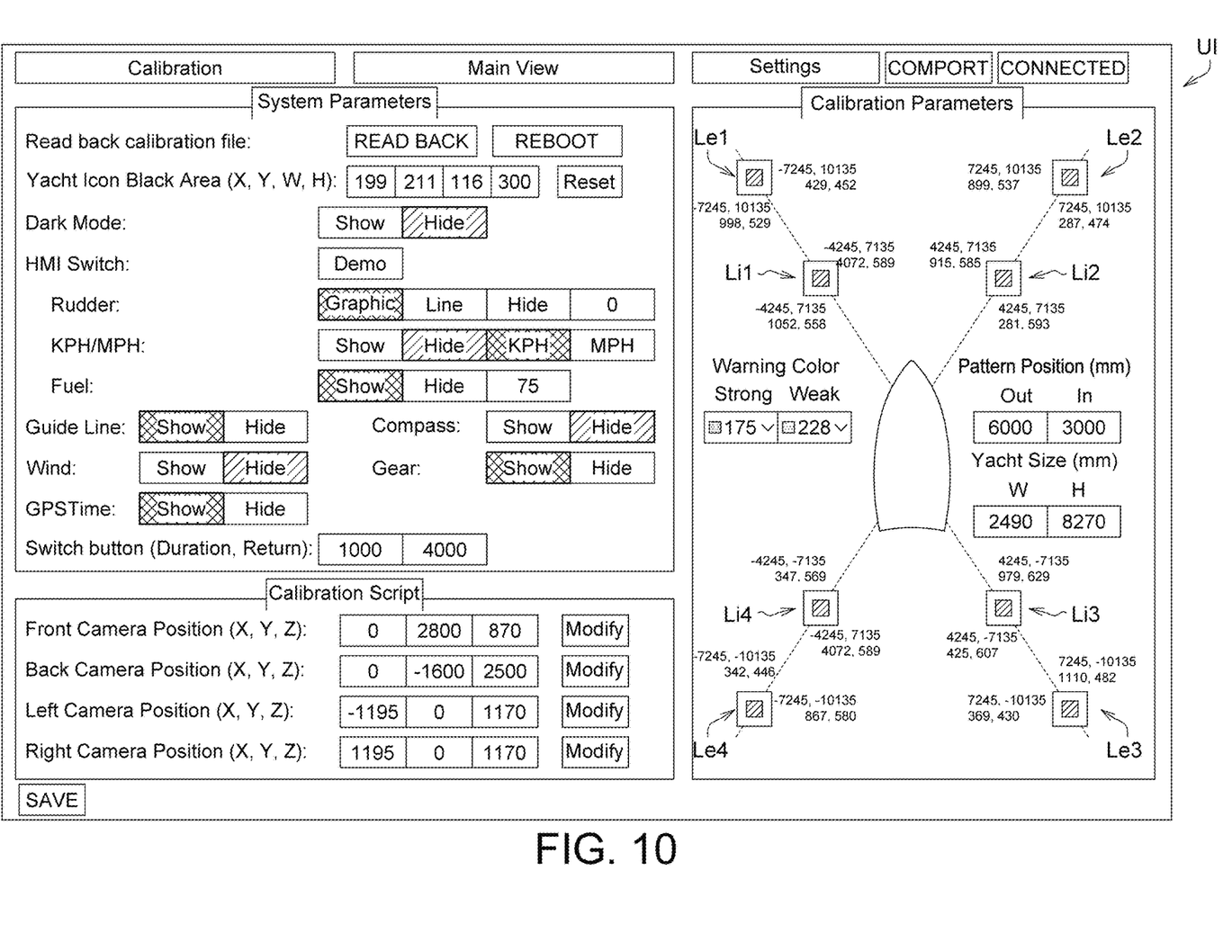
FIG. 10 illustrates one frame of a user interface according to an embodiment of the present disclosure.

Please refer to FIG. 10, which illustrates one frame of the user interface UI according to an embodiment of the present disclosure. In the step S410, as shown in FIG. 10, a user interface UI is provided. The user interface UI allows the user to enter the ship information SZ of the ship 1000.

Next, in the step S420, as shown in FIG. 10, the setting positions Le1, Le2, Le3, Le4, Li1, Li2, Li3, Li4 of the aforementioned external correction marks MKe1, MKe2, MKe3, MKe4 and the internal correction marks MKi1, MKi2, MKi3, MKi4 are displayed in the user interface UI. As mentioned above, the setting positions Le1, Le2, Le3, Le4, Li1, Li2, Li3, Li4 are obtained according to the ship information SZ and the resolution information RS of the image capture devices 210, 220, 230, 240.

In the example in FIG. 10, the ship size is "ship width: 2490, ship length: 8270", the position of the correction marks is "distance between the ship edge and the external correction marks: 6000, distance between the ship edge and the internal correction marks: 3000", the size of the correction mark is "width: 3000, length: 3000", the coordinates of the correction marks in the actual environment (the origin is the center point of the ship) are "outside: (±7245, ±10135), inside: (±4245, ±7135)", the ship shape is "pointed bow ship" and the camera resolution is "1280×960". The distance between the ship edge and the external correction mark is related to the maximum viewing range of the corresponding image capture device 210, 220, 230 or 240, for example, 4 to 6 meters. Under the ship information SZ and the resolution information RS, the setting positions Le1, Le2, Le3, Le4, Li1, Li2, Li3, Li4 in FIG. 10 could be obtained.

Figure 11:
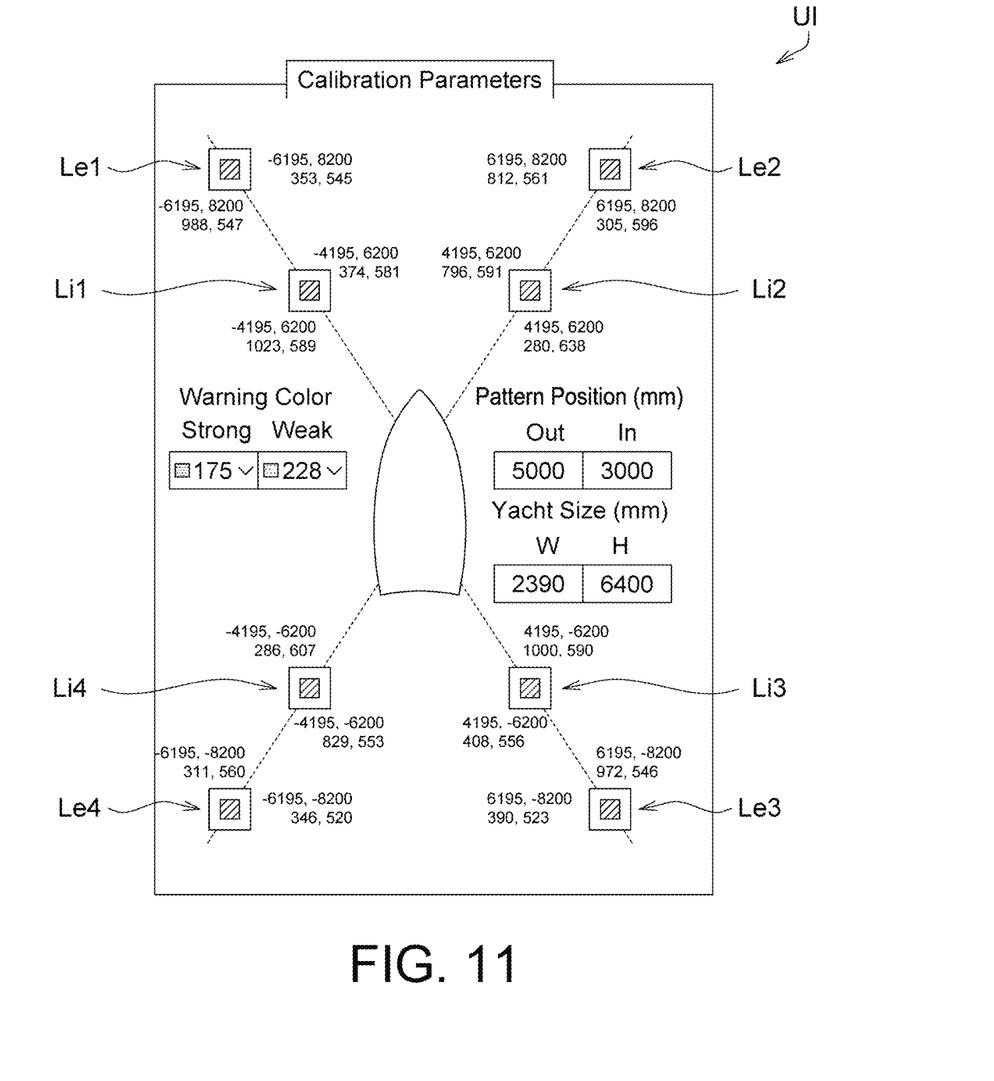
FIG. 11 illustrates another frame of the user interface.

Please refer to FIG. 11, which illustrates another frame of the user interface UI. In the example in FIG. 11, the ship size is "ship width: 2390, ship length: 6400", the position of the correction marks is "distance between the ship edge and the external correction marks: 5000, distance between the ship edge and the internal correction marks: 3000", the size of the correction mark is "width: 2000, length: 2000", the coordinates of the correction marks in the actual environment (the origin is the center point of the ship) are "outside: (±6195, ±8200), inside: (±4195, ±6200)", the ship shape is "square ship", and the camera resolution is "1280×960". Under the ship information SZ and the resolution information RS, the setting positions Le1, Le2, Le3, Le4, Li1, Li2, Li3, Li4 in FIG. 11 could be obtained.

Figure 12:
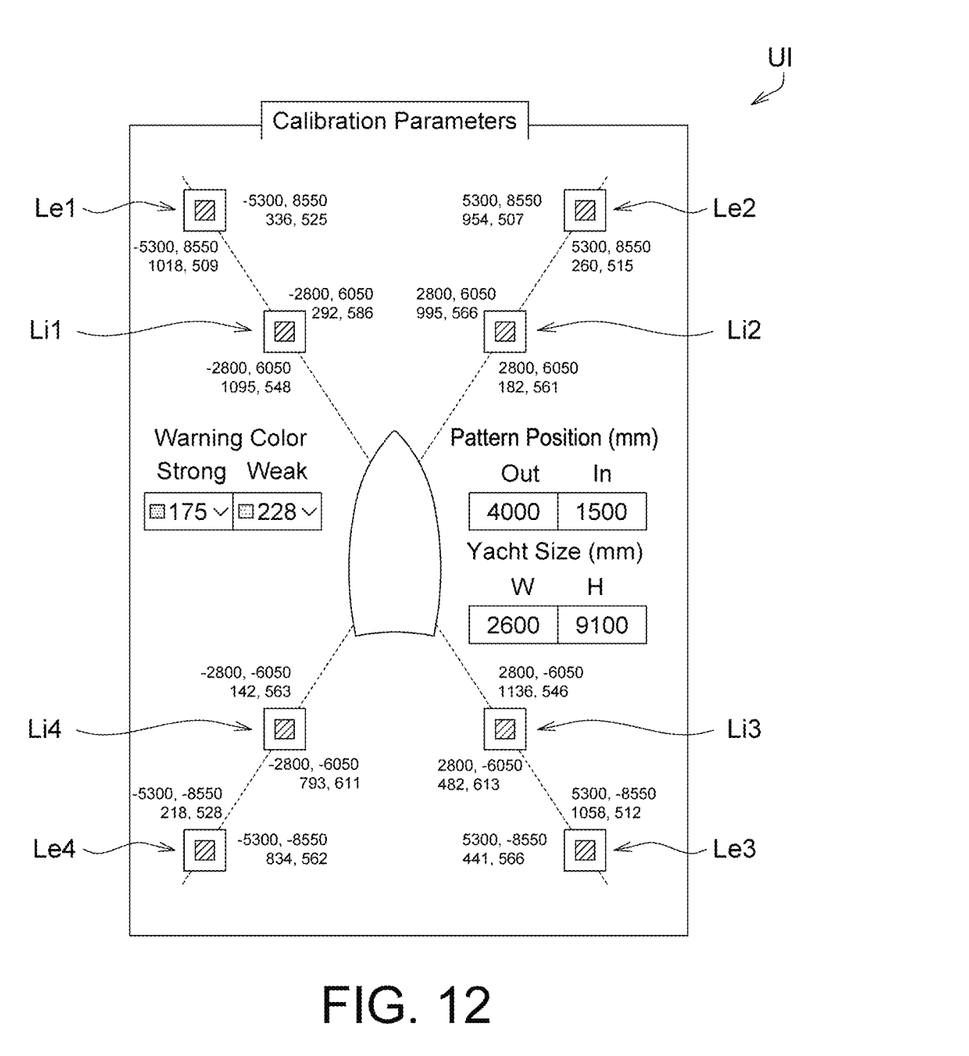
FIG. 12 illustrates another frame of the user interface.

Please refer to FIG. 12, which illustrates another frame of the user interface UI. In the example in FIG. 12, the ship size is "ship width: 2600, ship length: 9100", the position of the correction marks is "distance between the ship edge and the external correction marks: 4000, distance between the ship edge and the internal correction marks: 1500", the size of the correction mark is "width: 2500, length: 2500", the coordinates of the correction marks in the actual environment (the origin is the center point of the ship) are "outside: (±5300, ±8550), inside: (±2800, ±6050)", the ship shape is "square ship", and the camera resolution is "1280×960". Under the ship information SZ and the resolution information RS, the setting positions Le1, Le2, Le3, Le4, Li1, Li2, Li3, Li4 in FIG. 12 could be obtained.

Figure 13:
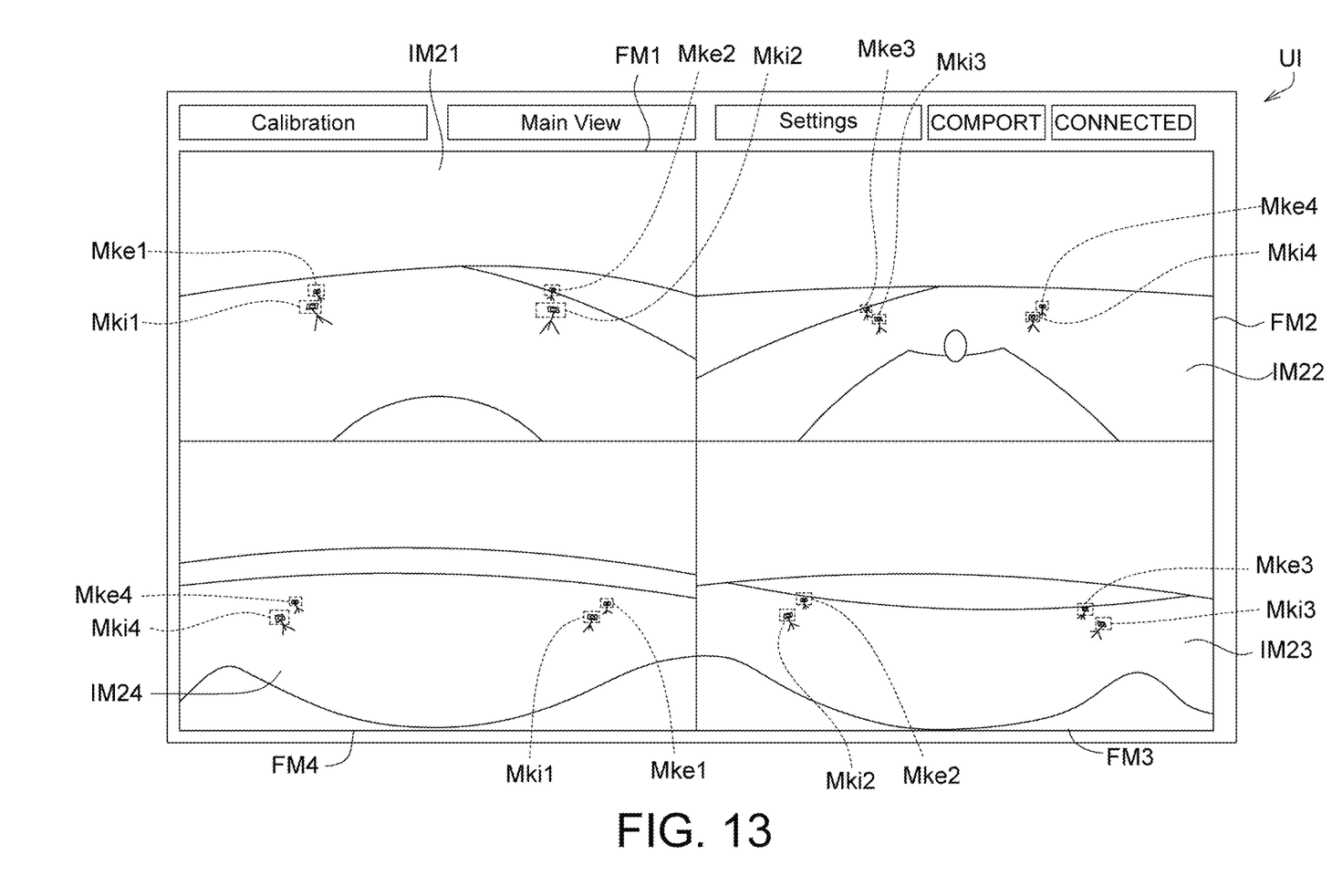
FIG. 13 illustrates another frame of the user interface.

Please refer to FIG. 13, which illustrates another frame of the user interface UI. In the step S430, as shown in FIG. 13, the user interface UI provides a plurality of frames FM1, FM2, FM3, FM4 to display the images IM21, IM22, IM23, IM24 captured by the image capture devices 210, 220, 230, 240.

Next, in the step S440, as shown in FIG. 13, two of the external correction marks MKe1, MKe2, MKe3, MKe4 and two of the internal correction marks MKi1, MKi2, MKi3, MKi4 are marked on each of the images IM21, IM22, IM23, IM24.

Then, in the step S450, the position image coordinates C1$e$1, C1$i$l, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 of the external correction mark MKe1, MKe2, MKe3, MKe4 and the internal correction mark MKi1, MKi2, MKi3, MKi4 in the images IM21, IM22, IM23, IM24 are recorded. For example, they are directly recorded in the storage unit 140. After the accurate position image coordinates C1$e$1, C1$i$l, C1$e$2, C1$i$2, C2$e$3, C2$i$3, C2$e$4, C2$i$4, C3$e$2, C3$i$2, C3$e$3, C3$i$3, C4$e$1, C4$i$1, C4$e$4, C4$i$4 are recorded, the ship 1000 could perform stitching or fusion of the images IM11, IM12, IM13, IM14 during operation to quickly obtain the accurate panoramic image IM1.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A correction method for a panoramic image of a ship, comprising:
   providing a ship information of the shop;
   providing a resolution information of a plurality of image capture devices disposed around the ship;
   obtaining a plurality of setting positions of a plurality of external correction marks and a plurality of internal correction marks according to the ship information and the resolution information of the image capture devices, wherein the external correction marks and the internal correction marks are placed around the ship according to the setting positions;
   capturing a plurality of images by the image capture devices;
   recognizing two of the external correction marks and two of the internal correction marks in each of the images; and
   recording a plurality of position image coordinates of the external correction marks and the internal correction marks at the images, wherein the position image coordinates are used to obtain the panoramic image.

2. The correction method for the panoramic image of the ship according to claim 1, wherein the setting positions of the external correction marks are located at outer corner points of a view range.

3. The correction method for the panoramic image of the ship according to claim 1, wherein each of the external correction marks and each of the internal correction marks corresponding thereto are located at diagonal points of a rectangle.

4. The correction method for the panoramic image of the ship according to claim 3, wherein the rectangles are located at a plurality of corners of a viewing range.

5. The correction method for the panoramic image of the ship according to claim 1, wherein a first distance between each of the external correction marks and a long side of the ship is relative to a maximum viewing range of the image capture device disposed on the long side.

6. The correction method for the panoramic image of the ship according to claim 5, wherein the first distance is 4 to 6 meters.

7. The correction method for the panoramic image of the ship according to claim 1, wherein the external correction marks and the internal correction marks are disposed at a height position that is on an identical horizontal plane as a waterline of the ship.

8. The correction method for the panoramic image of the ship according to claim 1, wherein each of the external correction marks and each of the internal correction marks includes a first color block and a second color block, and the second color block surrounds the first color block.

9. The correction method for the panoramic image of the ship according to claim 8, wherein the first color block and the second color block are contrasting colors.

10. The correction method for the panoramic image of the ship according to claim 8, wherein a width of the second color block is greater than 10 cm.

11. The correction method for the panoramic image of the ship according to claim 8, wherein the first color block is a rectangle, and an edge of the second color block is an octagon.

12. The correction method for the panoramic image of the ship according to claim 1, wherein sizes of each of the external correction marks and each of the internal correction marks are substantially identical.

13. A correction system for a panoramic image of a ship, comprising:
   a correction mark setting unit, configured to obtain a plurality of setting positions of a plurality of external correction marks and a plurality of internal correction marks according to a ship information and a resolution information of a plurality of image capture devices, wherein the external correction marks and the internal correction marks are placed around the ship according to the setting positions;
   a storage unit, configured to store a plurality of images captured by the image capture devices;
   a recognizing unit, configured to recognize two of the external correction marks and two of the internal correction marks in each of the images; and
   a coordinate unit, configured to record a plurality of position image coordinates of the external correction marks and the internal correction marks at the images to the storage unit, wherein the position image coordinates are used to obtain the panoramic image.

14. The correction system for the panoramic image of the ship according to claim 13, wherein the setting positions of the external correction marks are located at outer corner points of a view range.

15. The correction system for the panoramic image of the ship according to claim 13, wherein each of the external correction marks and each of the internal correction marks corresponding thereto are located at diagonal points of a rectangle.

16. The correction system for the panoramic image of the ship according to claim 15, wherein the rectangles are located at a plurality of corners of a viewing range.

17. The correction system for the panoramic image of the ship according to claim 13, wherein a first distance between each of the external correction marks and a long side of the ship is relative to a maximum viewing range of the image capture device disposed on the long side.

18. The correction system for the panoramic image of the ship according to claim 17, wherein the first distance is 4 to 6 meters.

19. The correction system for the panoramic image of the ship according to claim 13, wherein the external correction marks and the internal correction marks are disposed at a height position that is on an identical horizontal plane as a waterline of the ship.

20. An auxiliary method for a correction procedure of a panoramic image of a ship, comprising:
   providing a user interface for a user to input a ship information of the ship;
   displaying a plurality of setting positions of a plurality of external correction marks and a plurality of internal correction marks in the user interface, wherein the setting positions are obtained according to the ship information and a resolution information of a plurality of image capture devices, the image capture devices are disposed around the ship, and the external correction marks and the internal correction marks are placed around the ship according to the setting positions;

providing a plurality of frames to display a plurality of images captured by the image capture devices;
indicating two of the external correction marks and two of the internal correction marks in each of the images; and
recording a plurality of position image coordinates of the external correction marks and the internal correction marks at the images, wherein the position image coordinates are used to obtain the panoramic image.

\* \* \* \* \*